May 8, 1962  G. A. HOTHAM  3,033,987
ELECTRONIC DISPLACEMENT FOLLOWER APPARATUS
Filed March 23, 1959  2 Sheets-Sheet 2
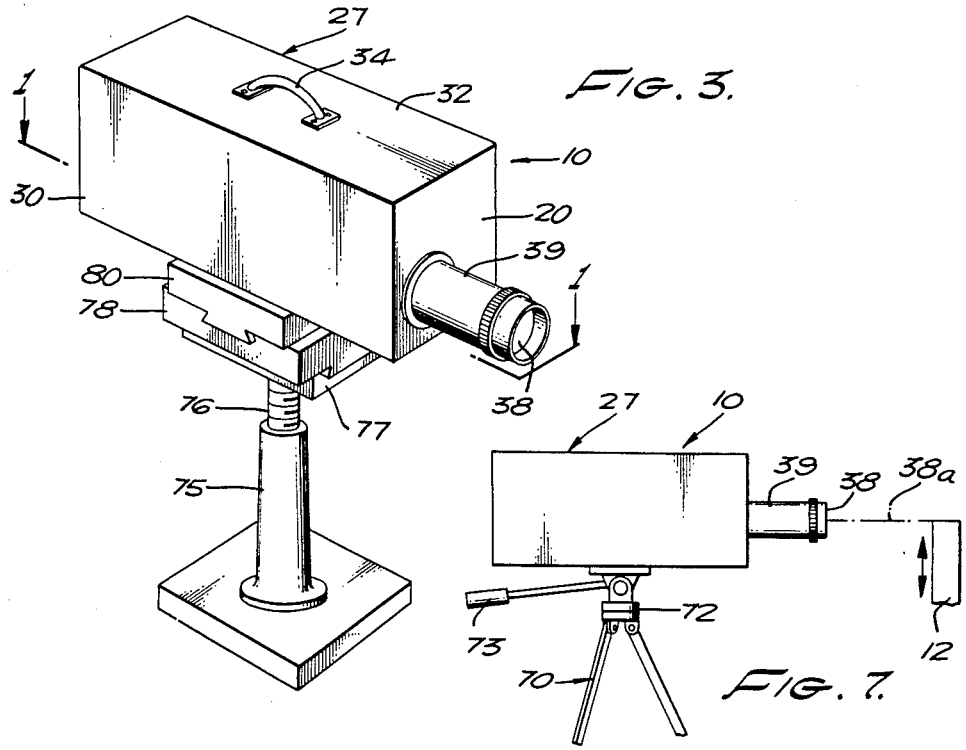
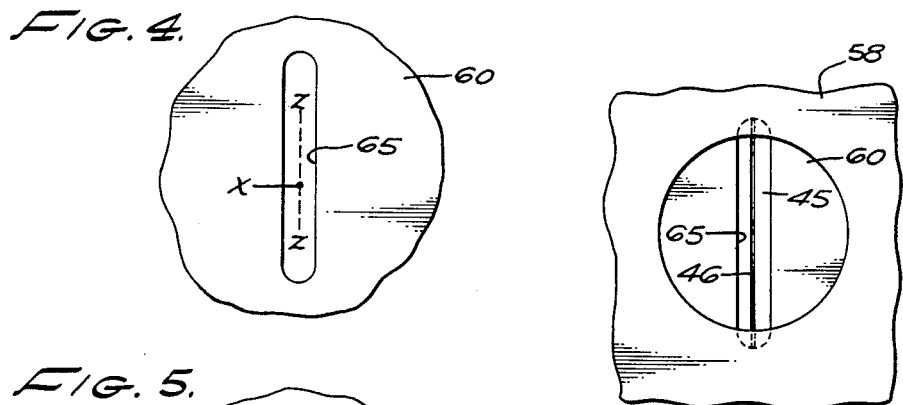
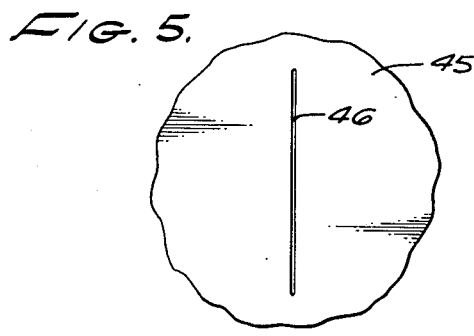
GEOFFREY A. HOTHAM
INVENTOR.
BY
ATTORNEY

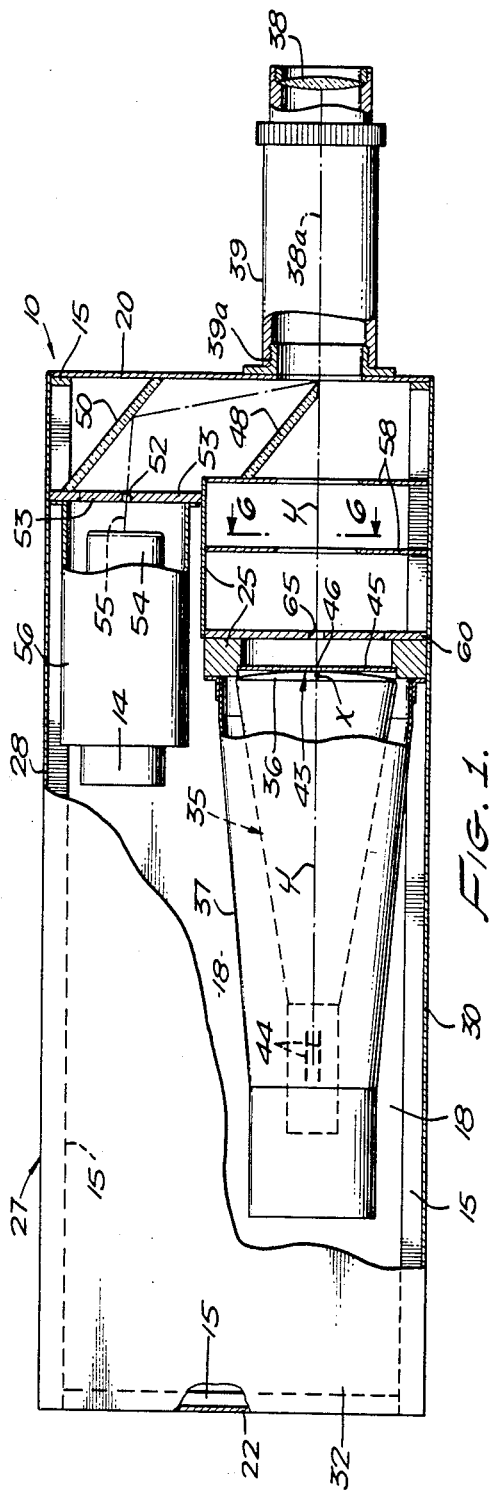

United States Patent Office 3,033,987
Patented May 8, 1962

3,033,987
ELECTRONIC DISPLACEMENT FOLLOWER APPARATUS
Geoffrey A. Hotham, Santa Barbara, Calif., assignor to Optron Corporation, Santa Barbara, Calif., a corporation of California
Filed Mar. 23, 1959, Ser. No. 801,120
21 Claims. (Cl. 250—203)

This invention relates to improvements in displacement followers of the type in which a light spot is projected upon a part of a moving object, and in which the light spot is moved so as to be substantially continuously directed upon such a part of the object while the object is moving, and in which apparatus the movement of the object is detected and measured or otherwise indicated or utilized by measuring the displacement of the light spot.

One of the objects of this invention is to provide an improved arrangement in which light reflected from the moving object is detected.

Another object of the invention is to provide, in such a system employing reflected light, an improved arrangement of light-projecting means and light-detecting means which provide a relatively high sensitivity to reflected light and a relatively low sensitivity to extraneous light.

A further object of the invention is to provide such a system by means of which extraneous light and its effects are substantially eliminated.

Another object of the invention is to provide an improved arrangement for automatically following the position of reflected light while excluding extraneous light in such a displacement follower apparatus.

Another object of the invention is to provide an arrangement in which the signal-to-noise ratio of the reflected light is increased.

Still another object of the invention is to provide an apparatus of the indicated type which may be employed even in the presence of considerable light, such as found in the conventional machine shop or testing laboratory.

An additional object is to provide reflective relationships in systems of the present type to reduce extraneous light effects to an extremely low minimum through the employment of improved optical arrangements.

The foregoing and other objects of the invention will be understood by reference to the following description and the single embodiment which is illustrated in the accompanying drawings.

In the drawings:

FIG. 1 is a longitudinal sectional view on an enlarged scale of the present improvement, portions of the housing and other parts being broken away to facilitate illustration;

FIG. 2 is a schematic diagram of my improved displacement follower and indicating the relationship of the operative parts;

FIG. 3 is a perspective view showing the apparatus mounted for use;

FIGS. 4, 5 and 6 are fragmentary vertical elevations taken from the front of the oscilloscope, as from the line 6—6 of FIG. 1, to show means controlling light scattering and reducing the amount of light transmitted; and FIG. 7 is a side elevation of the improved apparatus mounted for a somewhat modified use.

In the embodiment of the invention illustrated in the drawings, the displacement follower comprises a housing 10, which includes optical means for projecting a small spot X of light onto an edge or other discrete part of a moving object 12 (FIGS. 2 and 7), such as a tool or toolholder or other operating part. The follower also includes within the housing 10 means in the form of a photo-multiplier tube 14 for receiving light reflected from the object 12, together with means controlled by the photo-multiplier for moving the spot X of light in such a way that its image projected toward the object is continuously focused on the same part of the object 12. Except for the means that projects the spot of light X, the housing is substantially light-tight.

One of the novel features of this invention involves the orientation of the photo-multiplier tube and the light-projecting and receiving system, in order to substantially eliminate extraneous signals and therefore the effects of such extraneous signals. Still another feature of the invention involves an arrangement for reducing noise signals otherwise associated with the light source.

The housing 10 is of substantially rectangular configuration and includes a framework 15 carrying an elongated base member 18 of the housing. Front and rear walls 20 and 22 are respectively rigidly mounted at opposite ends of the framework 15 and the base member 18, and intermediate structural supporting means 25 also are rigidly secured in position to carry other mechanisms herein described. A U-shaped cover member 27, which includes side walls 28 and 30 and a top wall 32, serves to complete the housing. The cover member 27 is firmly but removably secured to the base member 18 and to the end walls 20 and 22 thereof by suitable fastening means (not illustrated). A handle 34 is firmly secured to the upper part of the cover 27 to facilitate carrying the apparatus.

The spot X of light is provided by a cathode ray oscilloscope tube 35 having a face 36 and arranged on an axis indicated by the line Y—Y, such axis being located in a position parallel to the longitudinal axis of the housing 10. The oscilloscope tube 35 and its face 36 are mounted in an appropriate metal shield 37 carried in the structure 25 on the base member 18 of the housing 10 and in a pre-established position relative to the front wall 20 and relative to a fixed focusing lens 38 mounted in a holder tube 39 fixedly carried by the front wall 20 of the housing 10, as by means of a threaded mounting 39a (FIG. 1).

The oscilloscope tube 35 is provided with an electron gun 40 (FIG. 2) which is arranged in a conventional manner to cause a beam of accelerated electrons 42 to be projected in the general direction of the axis Y—Y toward the face 36 of the tube 35. In practice, a Type 3ACP15A tube has been employed. Such tube bears a screen in the form of a coating 43 (FIG. 1) composed of a P15 phosphor on the interior surface of the tube face 36. When the beam 42 strikes the phosphor screen, the particular part of the screen so struck becomes excited, thereby emitting radiation and thus providing the spot X of light. Suitable means, such as a pair of deflection plates 44, are employed to deflect the beam along a vertical line Z—Z (FIG. 4) that is transverse to the longitudinal axis Y—Y, and thus to move the spot X along the vertical line Z—Z. This spot of light then passes to the focusing lens 38, whose axis 38a is aligned with the axis Y—Y of the oscilloscope tube 35.

In front of the tube face 36, two slightly spaced gate or jaw means 45 are mounted to provide an entrance slit 46. Disposed in the path of such beam is a beam splitter in the form of an oblique opaque, half-field beam-splitting mirror 48 set at an angle of less than 45° to the axis 38a of the lens 38 and shaped and positioned to block about half of the light passed by the slit 46 so that the back of the mirror absorbs most of the light striking it and reflects the remainder. To aid in removing such light and other stray light, the rear surface of the mirror 48 and other surfaces that are not intended to reflect or transmit light are coated with black paint or the like. The other half of the light passes through the lens 38 by which it is focused to provide a light spot upon the object 12 being tested. A part of the light reaching the object 12 is reflected back through the lens 38 (in a manner presently to be described) and is then reflected by the front of the mirror 48 to another oblique mirror 50 disposed laterally of the mirror 48 and about parallel thereto. This latter mirror 50 reflects such remaining portion of the light through a second or exit slit 52, which is provided by slightly spaced jaws 53, the beam passing through the slit 52 being thereby directed to a photosensitive surface 54 at the front of the photomultiplier tube 14. The axis of the tube 14, which is indicated at 55, is desirably disposed parallel to the axis Y—Y of the oscilloscope tube 35, which, as previously indicated, is coincident with the axis 38a of the lens 38 in the holder 39.

In practice, the lens 38 is of rather short focal length and is mounted at the outer end of its supporting tube 39. This lens 38 serves to focus an image of the light spot X at a point somewhat forward of the apparatus. In testing a moving object, this point will be located, by proper positioning of the displacement follower, on the moving object 12 being tested. The image of the light spot X is sharply focused on a part of the object 12 which is characterized by a line of demarcation that separates an area of high reflection coefficient from an area of low reflection coefficient, the line of demarcation lying transverse to the direction of movement of the object. In the case where the axis or direction of movement of the object 12 is vertical, the line of demarcation is horizontal or otherwise inclined to the vertical. This line of demarcation may be provided by an extreme edge of the object, as indicated in FIG. 7, or by forming a sharp line of demarcation on the object by an applied target, as indicated in FIG. 2 and more fully hereinafter described.

The photo-multiplier tube 14 is of the end-on type, in which the photosensitive surface 54 is arranged at the forward end thereof. In the displacement follower of this invention, the photo-multipler tube 14 with its photosensitive surface 54 may be mounted in a tubular support or carrier 56 disposed about the axis 55 of the photomultiplier tube 14, the plane of the photosensitive surface 54 being substantially normal to the common axis 55 of the tubular support 56 and the photo-multiplier 14.

As shown in FIG. 1, the gates or jaws 45 and 53, above indicated as providing the entrance slit 46 and the exit slit 52, are all mounted as a fixed unit with the mirrors 48 and 50, the multiplier tube 14 and the oscilloscope 35. In addition to these masking means 45 and 53, additional aperatured masking plates 58 are positioned forward of the oscilloscope face 36 to obstruct scattering light rays from the light spot X, and also an intermediate masking plate 60 is used as described below.

In connection with the passing of light beams 42 of the spot of light X from the phosphor screen 43 through the entrance slit 46, past the beam-splitting mirror 48, through the focusing lens 38 to the work 12 being tested, and the passage of the reflected light back through the lens 38 for deflection by the beam-splitting mirror 48 to the mirror 50 and thence through the exit slit 52 to the photosensitive surface 54, this optical layout is so arranged that the distance from the light spot X on the phosphorescent screen 43 to the beam-splitting mirror 48 (or the lens 38) is exactly equal to the optical path length from the beam-splitting mirror 48 (or lens 38) via the second mirror 50 to the photosensitive surface 54. Hence the re-imaged spot on the photo tube surface 54 has the same size as the spot X on the screen 43. The slits 46 and 52 are made very small, e.g. 0.010" wide, and pass only the light reflected from the projected spot on the work 12 back to the photosensitive surface 54. Hence, the field of view at the photocell 14 is restricted and the photocell "sees" only the spot on the work. Thus, this photocell cannot "see" other or ambient light in the room. Therefore, this instrument is not troubled by ambient light that is either of variable intensity or of variable or suddenly changing intensity.

The described function is readily attained by virtue of the fact that the axis Y—Y of the oscilloscope tube 35 and the axis 55 of the photomultiplier tube 14 and its photosensitive surface 54 are parallel and the fact that the mirrors 48 and 50 are set at angles of about 45° to said axis so that the beam traveling between such mirrors travels at such an angle that the light spot on the object is focused at or near the exit slit 52.

If it should be that the distance between the photosensitive surface 54 and the surface of the beam-splitting mirror 48, via the mirror 50, should be greater than or less than the distance between the spot X on the phosphor screen 43 and the beam-splitting mirror 48, such greater distance will result merely in de-focusing of the re-imaged spot at the slit 52. Any resultant loss of sensitivity can be compensated for by adjustment of the gain of the amplifier 62. A de-focusing lens is included between the exit slit 52 and the photo-cathode to minimize effects of variations in the sensitivity of different parts of the photo-cathode.

In operation, the output of the photo-multiplier tube 14 is applied to the input of an amplifier 62 (FIG. 2). The output from the amplifier 62 is a signal which changes in magnitude in accordance with the change of intensity of light striking the photosensitive surface 54. This amplifier output is impressed upon the vertical-deflection plates 44. It is also applied to a cathode follower 64 which feeds an external signal indicator 68, such as an indicating or recording galvanometer. This servo-mechanism keeps the light spot focused on the work object 12 riding or "locked" on the edge or demarcation line of the work, with a fixed percentage, such as 50%, above and the remainder below the line, for example, according to the intensity of the light striking the photosensitive surface 54.

In practice, the displacement follower of this invention may be used in a room of low ambient illumination, but such illumination may, on the other hand, be of the order of 40-foot-candles such as the illumination found in a machine shop or office. The only radiation striking the photosensitive surface 54 of the photo-multiplier tube 14 is that which is reflected thereto, as above described, from the part of the object 12 upon which the image of the light spot X is focused, which part of the object 12 is, under the indicated circumstances, not subjected to high ambient illumination. With the light spot X in a given position, in which the image is focused at the upper edge, for example, of the object 12, if the object moves down, the intensity of illumination striking the photosensitive surface 54 diminishes. This diminution of the illumination reduces the voltage at the output of the amplifier 62 which is impressed upon the vertical-deflection plates 44 of the oscilloscope tube 35. The polarity of the voltage thus applied to the deflection plates 44 is so chosen that the electric field created between the deflection plates 44 causes the beam 42 to be deflected in such a direction, in this case upwardly, so that the image of the light spot X moves in a corresponding direction, in this case downwardly, thus following, for example, the edge of the object 12. As indicated in FIG. 6, a masking slot 65 is provided in the masking plate 60 positioned at the front of the oscilloscope or cathode ray tube 35 forward of the slit-providing jaws 45, such slot 65 being aligned with the vertical line Z—Z (FIG. 4) above mentioned, so as to reduce fluctuations in illumination that would otherwise occur because of "noise," that is, random fluctuations in illuminating originating in the parts of the phosphorescent screen 43, remote from the line Z—Z, by impingement of stray electrons thereon or for other reasons.

In this system, when the object moves, the projected image of the light spot X moves in the same direction so as to oppose a change in the amount of illumination striking the photosensitive surface 54. For this reason, the light spot X moves up and down on the surface 36 of the cathode ray tube 35 in a manner which corresponds to the movement of the object 12 up and down. Since the displacement of the light spot X is substantially proportional to the voltage impressed on the cathode follower amplifier 64, it is clear that the voltage impressed on such amplifier is approximately proportional to the vertical displacement of the object 12. The accuracy with which the spot follows the object is a function of the loop gain of the system, including the amplifier 62, the cathode ray oscilloscope 35, and the phototube 14. As previously indicated, the output from the amplifier 62 is applied to the cathode follower 64 which feeds the external signal indicator 68, such ans an indicating or recording galvanometer. As in any negative feedback system, the intensity of the illumination at the face 54 is not held exactly constant. As a result, the magnitude of the voltage appearing at the output of the amplifier actually varies in a corresponding way. Changes in this amplitude are indicated by the galvanometer 68 which indicates changes in the position of the spot X on the tube face 36 and hence changes in position of the object 12. In effect, the galvanometer 68 indicates the degree of registration of the light image with the part of the object upon which the image is focused, and changes in this indication indicate changes in position of the object. Though the displacement of the object be large, the change in degree of registration of the light image relative to the object is small.

For the best results, the image of the light spot X is focused sharply on the object 12. To facilitate such focusing, the housing 10 is mounted for appropriate adjustment by means such as a tripod 70, seen in FIG. 7, having a universal head 72 and a manipulating hand 73, or by means of a more rigid mount such as seen in FIG. 3. The mounting of FIG. 3 provides for a vertical adjustment, rotary adjustment and sliding horizontal adjustment in transverse planes. For this purpose, a vertical standard 75 is provided, which receives a threaded stem 76 carrying at its top a slide combination including a lower slide plate 77 upon which an intermediate slide plate 78 is mounted through the medium of a dovetail slide connection, such intermediate slide 78 having mounted thereon, by a dove-tail mount, a top slide 80 upon which is fixed the base member 18 of the housing 10. By these simple means, the displacement follower of this improvement carried in the housing 10 may be set to direct the lens 38 with the light beam projected thereby to play upon the upper edge of the object 12, as indicated in FIG. 7, or upon the transverse demarcation line of a target as seen in FIG. 2. As has been previously indicated, the lens 38 ordinarily will be of short focal length and is fixed in its holder tube 39. If required for various types of work, different lenses 38 of different focal lengths may be provided, and tubes 39 carrying such lenses interchanged in the mounting therefor at the front of the housing 10, as indicated at 39*a* in FIG. 1.

With respect to the use of a target to provide a line of demarcation with which to work, rather than to employ an edge of the moving object 12, as indicated in FIG. 7, such a target, which is shown at 80 in FIG. 2, is produced for application to the work as required. The target for the particular work here envisaged will ordinarily be quite small; it may, for example, be only about 1/8 of an inch square, but it may be larger or smaller, as conditions dictate. Such a target has an upper non-reflective surface 82 and a lower reflective surface 84, which may be respectively dull black and white defining a sharp boundary between them. This target may be of the decalcomania type for application to the face of the object 12, or it may be of an ordinary paper sticker type providing the indicated black and white sections. Such target has substantially the same effect upon a projected spot of light as does the sharp upper edge of the moving object 12 indicated in FIG. 7, and probably has the further advantage that no ambient light from surfaces immediately behind the target can be reflected to the lens 38, as might occur when using the upper edge of the moving object itself. Other target means also are useful, such as that produced by buffing off an area of the work to be highly reflective, and then masking the upper portion of such reflective surface with a flat, black poster paint, thereby providing the desired line of demarcation. By the means described, proper reflection of a light spot and its conduction into the photo-multiplier tube 14 are readily attained, and the desired control of the apparatus in accordance with the degree of registration of such light spot image and the respective part of the target is also accomplished, so that the movement of the object is readily determined by means of the registering or recording galvanometer 68 or the like.

From the foregoing explanation, it is thus seen that an improved displacement follower has been provided that is characterized by a high signal-to-noise ratio. This characteristic of this invention is achieved by reducing the amount of extraneous light received from a moving object compared with the amount of light received from a spot on that object. Though the invention has been described with reference to only a particular form thereof, it will be obvious that the invention is not limited thereto, but is capable of being embodied in many other forms. Various changes will now, therefore, suggest themselves to those skilled in the art in the material form, details of construction, and arrangements of the various elements within the scope of the invention. More particularly, it will be understood that other sources of light may be employed than that specifically described. In the best embodiment of the invention, however, which utilizes a cathode ray tube, the phosphor employed on the screen of the tube should have a decay time that is short compared with the periods of oscillation of the moving object. It is also to be understood that the various parts may be arranged in other geometrical configurations than that illustrated and described. Furthermore, it will be understood that the beam splitter need not be in the form of a half-field mirror as illustrated, but may be in the form of a semi-reflecting mirror that intercepts the entire beam. Reference is therefore made to the appended claims to determine the scope of the invention.

The invention claimed is:

1. In a displacement follower in which the displacement of a moving object is detected:

a base member having a longitudinal axis;

a source of light carried by said base member;

optical means carried by said base member for projecting light from said source along said longitudinal axis toward said object for focusing an image of said source of light on a part of said object;

a photosensitive surface carried by said base member for receiving light reflected thereto from said part of said object, the normal to said photosensitive surface being displaced with respect to said longitudinal axis directed toward said object;

deflecting means for moving said source of light along a predetermined line transverse to the longitudinal axis of said base member, whereby said image is moved transverse to said longitudinal axis at the position of said object;

means including a mirror disposed adjacent said longitudinal axis for transmitting light from said source through said optical means to said part of said object and for transmitting light reflected from said object through said optical means to said photosensitive surface; and means controlled by said photosensitive surface in accordance with the amount of light directed thereto for determining the degree of registration of said image with said part of said object.

2. A displacement follower as in claim 1 wherein said mirror has one edge positioned in a plane at and parallel to said longitudinal axis for intercepting and deflecting to said photosensitive surface reflected light passing at approximately one side only of said longitudinal axis and said plane.

3. A displacement follower, as in claim 1, wherein said optical means comprises a focusing element and wherein said mirror is an opaque mirror that limits the transmission of light from said source through about half said focusing element to said object and limits the transmission of light from said object through the other half of said focusing element to said photosensitive surface.

4. A displacement follower as in claim 1 wherein said source of light is provided by an excited part of the screen of a cathode ray oscilloscope tube.

5. A follower as in claim 4 including masks located adjacent said screen and masks adjacent said photosensitive surface providing slits for reducing the amount of said light reaching said photosensitive surface.

6. A follower as in claim 5 wherein said optical means comprises a focusing element and in which the length of the optical path from said focusing element to said cathode ray tube screen is substantially equal to the length of the optical path from said focusing element to the slit formed by the masks adjacent said photosensitive surface.

7. A follower as in claim 1 wherein the normal to said photosensitive surface is substantially parallel to said longitudinal axis and comprising a second mirror for directing the intercepted light toward said photosensitive surface.

8. A follower as in claim 7 wherein a mask is located closely adjacent said photosensitive surface and is provided with a slit for reducing the amount of reflected light reaching said photosensitive surface.

9. A follower as in claim 1 including masks located adjacent said screen to expose the parts of said screen which are excited during operation to provide such light source and masks adjacent said photosensitive surface to expose the portion of said photosensitive surface to which said reflected light is transmitted, said masks providing slits for reducing the amount of said light reaching said photosensitive surface.

10. A follower as in claim 4 wherein said optical means comprises a focusing element and in which the length of the optical path from said focusing element to said cathode ray tube screen is substantially equal to the length of the optical path from said focusing element to said photosensitive surface.

11. In a displacement follower in which the displacement of a moving object is detected:
  a base member having a longitudinal axis;
  a source of light carried by said base member;
  a photosensitive surface carried by said base member;
  optical means carried by said base member and having a longitudinal axis extending outwardly from said base member, said optical means being adapted for transmitting light from said source along said longitudinal axis toward said object for focusing an image of said source of light on a part of said object and for transmitting light reflected from said object to said photosensitive surface;
  deflecting means for moving said source of light along a predetermined path transverse to the longitudinal axis of said base member, whereby said image is moved transverse to said longitudinal axis at the position of said object; and
  control means operatively connected with said deflecting means and with said photosensitive surface and responsive to variations in intensity of reflected light received by said photosensitive surface for operating said deflecting means to move said source of light to cause said image to follow said part of said moving object.

12. A displacement follower as in claim 11 wherein the length of the optical path from said optical focusing means to said source of light is substantially equal to the length of the path from said optical focusing means to said photosensitve surface.

13. A displacement follower as in claim 11 wherein said source of light is an excited screen portion of a cathode ray tube, light-beam masking means is positioned adjacent said photosensitive surface, and the length of the optical path from said optical focusing means to said screen of said oscilloscope tube is substantially equal to the length of the optical path from said optical focusing means to said light-beam masking means for said photosensitive surface.

14. A displacement follower as in claim 11 including means controlled by said photosensitive surface to indicate the degree of registration of said light image with said part of said moving object.

15. A follower as in claim 11 wherein said source of light is an excited screen portion of a cathode ray oscilloscope tube.

16. A displacement follower, as in claim 15, for detecting vibratory motion of a moving object wherein the decay time of the screen of said cathode ray oscilloscope tube is short compared with the period of oscillation of said moving object.

17. A follower as in claim 14 wherein said source of light is the screen of a cathode ray oscilloscope tube.

18. A follower as in claim 11 wherein the normal to said photosensitive surface and said axis are parallel, and reflecting mirrors are positioned to transmit reflected light from said part of said object to said normal and to said surface.

19. A follower as in claim 18 wherein slit-providing masks are provided adjacent said light source and said photosensitive surface to reduce the amount of light reaching said photosensitive surface.

20. A displacement follower, as defined in claim 11, wherein said optical means comprises a lens and a beam-splitting mirror providing two branch optical axes, one of which is directed toward said source and the other of which is directed toward said photosensitive surface.

21. A follower as in claim 18 wherein one mirror is a half mirror located between said light source and said optical means to pass part of the light to said object and reflect part of the reflected light to the other mirror and thence to said photosensitive surface.

References Cited in the file of this patent

UNITED STATES PATENTS

| | | | |
|---|---|---|---|
| 2,645,971 | Herbst | | July 21, 1953 |
| 2,773,412 | Huck | | Dec. 11, 1956 |
| 2,870,671 | Falconi | | Jan. 27, 1959 |